(12) United States Patent
Gregg et al.

(10) Patent No.: US 7,818,945 B2
(45) Date of Patent: Oct. 26, 2010

(54) COMPOSITE STRUCTURAL MEMBER HAVING AN UNDULATING WEB AND METHOD FOR FORMING SAME

(75) Inventors: Paul S. Gregg, Seattle, WA (US); Max U. Kismarton, Renton, WA (US); Jeff D. Will, Renton, WA (US)

(73) Assignee: The Boeing Company, Chicago, IL (US)

( * ) Notice: Subject to any disclaimer, the term of this patent is extended or adjusted under 35 U.S.C. 154(b) by 852 days.

(21) Appl. No.: 11/541,620

(22) Filed: Sep. 29, 2006

(65) Prior Publication Data
US 2007/0022707 A1 Feb. 1, 2007

Related U.S. Application Data

(63) Continuation-in-part of application No. 11/096,795, filed on Mar. 31, 2005.

(51) Int. Cl.
*E04C 3/00* (2006.01)
(52) U.S. Cl. ............... 52/837; 52/840; 52/841
(58) Field of Classification Search .......... 52/837, 52/840, 841
See application file for complete search history.

(56) References Cited

U.S. PATENT DOCUMENTS

| 101,015 | A | * | 3/1870 | Holms | .......... 52/840 |
| 4,084,029 | A | * | 4/1978 | Johnson et al. | ............. 428/119 |
| 4,198,018 | A | | 4/1980 | Brault | |
| 4,734,146 | A | | 3/1988 | Halcomb et al. | |
| 5,833,786 | A | | 11/1998 | McCarville et al. | |
| 6,170,217 | B1 | * | 1/2001 | Meyer | .......... 52/693 |
| 6,219,990 | B1 | * | 4/2001 | Snyder et al. | .......... 52/837 |
| 6,520,706 | B1 | * | 2/2003 | McKague et al. | .......... 403/265 |
| 6,701,690 | B2 | * | 3/2004 | Deschenes | .......... 52/837 |
| 7,080,805 | B2 | * | 7/2006 | Prichard et al. | .......... 244/117 R |
| 2003/0014938 | A1 | * | 1/2003 | Deschenes | .......... 52/729.2 |
| 2003/0115827 | A1 | * | 6/2003 | Sim et al. | .......... 52/729.1 |
| 2006/0237588 | A1 | | 10/2006 | Kismarton | |
| 2007/0022707 | A1 | * | 2/2007 | Gregg et al. | .......... 52/735.1 |
| 2008/0072527 | A1 | * | 3/2008 | Kondo et al. | .......... 52/729.1 |

\* cited by examiner

*Primary Examiner*—Richard E Chilcot, Jr.
*Assistant Examiner*—Andrew J Triggs
(74) *Attorney, Agent, or Firm*—Tung & Associates

(57) ABSTRACT

Composite structural members and methods for forming the same are disclosed. In one embodiment, a composite structural member includes a central structural portion that extends in a first direction and having a first flange portion and a second flange portion that are spaced apart in a second direction perpendicular to the first direction by a web portion, the web portion further including a periodic or a non-periodic undulation extending in the first direction. A first reinforced polymer-based substrate is fixedly coupled to the first flange portion, and a second reinforced polymer-based substrate is fixedly coupled to the second flange portion.

26 Claims, 6 Drawing Sheets

COMPOSITE STRUCTURAL MEMBER HAVING AN UNDULATING WEB AND METHOD FOR FORMING SAME

CROSS REFERENCE TO RELATED APPLICATIONS

This application is a continuation-in-part of U.S. patent application Ser. No. 11/096,795, filed Mar. 31, 2005. This patent application is also related to the following co-pending, commonly owned U.S. patent applications, which applications are hereby incorporated by reference: U.S. patent application Ser. No. 11/096,743 filed Mar. 31, 2005 entitled "Composite Structural Member and Method for Forming the Same"; U.S. patent application Ser. No. 11/096,796 filed Mar. 31, 2005 entitled "Hybrid Fiberglass Composite Structures and Methods for Forming the Same"; U.S. patent application Ser. No. 11/096,727 filed Mar. 31, 2005 entitled "Multi-Axial Laminate Composite Structures and Methods of Forming the Same"; and, U.S. patent application Ser. No. 11/464,650, filed Aug. 15, 2006 entitled "Apparatus and Method for Forming Corrugated Members".

FIELD OF THE INVENTION

This invention relates generally to structural components, and more particularly, to composite structural members, especially those used in commercial aircraft.

DESCRIPTION OF THE RELATED ART

Structural members are available in a wide variety of configurations to provide structural support under a variety of loading conditions, such as those encountered in modern commercial aircraft. For example, the wing and empennage surfaces of an aircraft typically include parallel and spanwise oriented structural members called stringers that impart flexural stiffness to the wing and empennage surfaces. Similarly, structural members in the form of floor beams are used to support loads within fuselage of the aircraft. Typically, the structural members referred to above are fabricated from a metal, such as aluminum, steel or titanium, which are particularly effective in resisting flexural and/or shear loads. In order to meet these requirements, the structural member is provided with a planar web portion that is generally oriented in a direction approximately parallel to the applied load so that the web portion offers resistance to a shear force generated by the load. A flange portion is provided on one or both of the longitudinal edges of the web portion in order to provide resistance to localized failure of the web portion due to lateral buckling. The flange portion further allows the structural member to be incorporated into a structure by providing an attachment and/or supporting surface for other adjacent members comprising the structure.

Reinforced polymer-based materials are also available that may be used to form various structural members, and are frequently used as a substitute for metals, particularly in applications where relatively low weight and high mechanical strength is desired. As a result, reinforced polymer-based materials are widely used in a variety of commercial and military aircraft, terrestrial vehicles and consumer products. The material generally comprises a network of reinforcing fibers that are generally applied in layers, and a polymeric resin that substantially wets the reinforcing fibers to form an intimate contact between the resin and the reinforcing fibers. The material may then be formed into a structural component by a variety of known forming methods, such as an extrusion process or other forming processes. While these materials exhibit good performance under tension and compression load, they are less effective than comparable metal structures in resisting shear loads.

Structural members formed from reinforced polymer-based materials are generally more expensive to fabricate, and more difficult to inspect and repair than corresponding structural members formed from metals, such as a ferrous metal, or various non-ferrous metals, such as aluminum and titanium. In particular, repair methods for metallic structural members that have sustained in-service damage due to excessive loading, or have sustained fatigue and/or corrosive damage while in service are well developed.

Complicating the design of modern commercial aircraft is the continuing need to reduce aircraft weight in order to increase load capacity and reduce fuel consumption. Accordingly, what is required is a structural member that is easily and inexpensively fabricated, provides a favorable flexural strength to weight ratio in comparison to conventional structural members, and may be easily inspected and repaired.

BRIEF SUMMARY OF THE INVENTION

In accordance with one aspect of the invention, a composite structural member is provided, comprising a central structural portion having first and second flange portions spaced apart and connected by a web having a planar section and a non-planar section. First and second reinforced, polymer-based substrates are respectively secured to the first and second flange portions. The non-planar portion of the web preferably comprises at least one of a periodic undulation portion and a non-periodic undulation portion. In one embodiment, the web portion has a depth that varies in the direction of the length of the structural member. The thickness of the web portion may also vary along the length of the structural member. Each of the reinforced polymer based substrates preferably is a fiber reinforced substrate having layers of fiber positioned in a predetermined pattern, comprising a first layer oriented at an angle between approximately one and twenty degrees with respect to a selected reference direction, and a second layer oriented at an angle between approximately fifty and eighty degrees with respect to the reference direction. In a preferred form of the invention, a fiber angle in the first layer is between three and twelve degrees, and the fiber angle in the second layer is between approximately 55 and 65 degrees. The first and second flange portions are welded to the web and each has a thickness between one and three times greater than the thickness of the web.

In accordance with another aspect of the invention, a special beam is provided for aerospace vehicles, comprising first and second spaced apart flanges; a web connecting the first and second flanges and having a thickness that varies in the direction of the length of the beam, as well as an undulating portion; and, a reinforced, polymer-based substrate secured to at least a portion of one of the first and second flanges. The web may include a flat portion joined to the undulating portion in order to facilitate attachment to other portions of the aerospace vehicle. The flat portion of the web may be deferred between undulating portions of the web. Each of the first and second flanges is welded to web and has a thickness one to two times greater than the thickness of the web.

In accordance with a further aspect of the invention, a method is provided of fabricating a composite structural member. The method includes forming a first web portion into a desired non-planar shape; forming a second web portion into a generally planar shape; forming a web by joining the first and second web portions; joining at least one flange portion to the web; and, joining a reinforced, polymer-based substrate to the one flange portion. The web portion may be formed into a periodic undulating shape or a non-periodic undulating shape. The first web portion may include the steps of forming first and second web sections in different thicknesses and then joining the web sections together.

The invention is advantageous in that structural members such as a floor beam may be formed that have both undulating web sections to maximize structural strength as well as flat web sections to allow attachment of the beam to supports, stanchions or other parts of the aircraft. The thickness of the web may be varied along its length in order to reduce the weight in those areas requiring less structural strength.

BRIEF DESCRIPTION OF THE SEVERAL VIEWS OF THE DRAWINGS

The disclosed embodiments of the present invention are described in detail below with reference to the following drawings.

DETAILED DESCRIPTION OF THE INVENTION

The present invention relates to composite structural members and methods for forming such members. Many specific details of certain embodiments of the invention are set forth in the following description and in FIGS. 1 through 8 to provide a thorough understanding of such embodiments. One skilled in the art, however, will understand that the present invention may have additional embodiments, or that the present invention may be practiced without several of the details described in the following description. In the present discussion, it is understood that a composite structural member refers to a member comprised of dissimilar materials, and that the term "reinforced polymer-based material" includes various non-homogeneous polymer-based materials, commonly referred to as "reinforced composites", "carbon-fiber composites", or still other terms known in the art.

Figure 1:
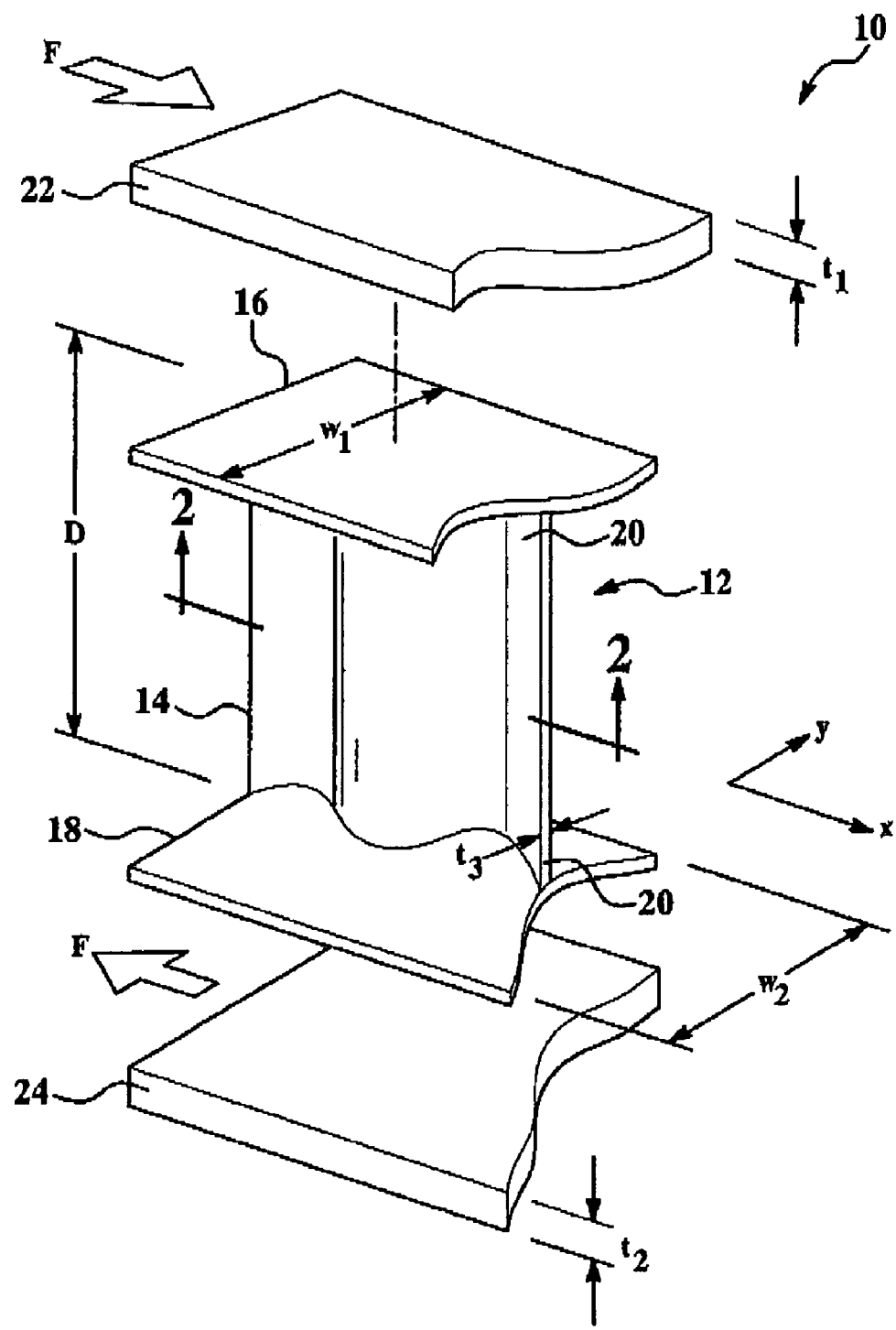
FIG. 1 is an exploded, partial isometric view of composite structural member according to an embodiment of the invention.

FIG. 1 is an exploded, partial isometric view of composite structural member 10 according to an embodiment of the invention. The composite structural member 10 includes a central structural portion 12 having a web portion 14 that is positioned between a first flange portion 16 and an opposing second flange portion 18. The web portion 14 may have a predetermined depth D in order to provide a desired resistance to shear loading in response to an applied load F, and is also formed to have a generally undulating shape, as will be described in greater detail below. The first flange portion 16 and the second flange portion 18 are generally planar members having predetermined widths W, and $W_2$, respectively. The opposing edges 20 of the web portion 14 are positioned on the first flange portion 16 and the second flange portion 18, and are fixedly joined to the first flange portion 16 and the second flange portion 18. The web portion 14 and the first flange portion 16 and the second flange portion 18 are generally formed from a rigid ferrous or non-ferrous material. In one particular embodiment, the central structural portion 12 is fabricated from titanium, and the web-portion 14 is formed to have approximately sinusoidal undulations (or corrugations). Although the central structural portion 12 shown in FIG. 1 includes a web portion 14 having an approximately constant depth D, it is understood that the depth D may be variable either continuously or even non-continuously, as the member 10 extends in an x-direction. It is further understood that the width $W_1$ of the first flange portion 16 and the width $W_2$ of the second flange portion 18 may also vary in a continuous or a non-continuous manner as the member 10 extends in the x-direction. As will become later apparent, the thickness $t_3$ of the web portion 14 may vary along its length in order to provide the structural member 10 with additional strength in certain sections to accommodate different loading conditions.

Still referring to FIG. 1, the composite structural member 10 also includes a first reinforced polymer-based substrate 22 having a thickness $t_1$, that is fixedly coupled to the first flange portion 16, and a second reinforced polymer-based substrate 24 having a thickness t2 that is fixedly coupled to the second flange portion 18. The first reinforced polymer-based substrate 22 and the second reinforced polymer-based substrate 24 may be coupled to the respective first and second flange portions 16 and 18 in any suitable manner, including using a suitable adhesive compound, or by means of mechanical fastening devices. For example, and in one particular embodiment, a multi-part epoxy compound may be used to bond the first reinforced polymer-based substrate 22 and the second reinforced polymer-based substrate 24 to the respective first and second flange portions 16 and 18. One suitable epoxy adhesive is the FM-300 structural adhesive available from Cytec Industries, Incorporated of West Paterson, N.J., although other suitable alternatives exist.

In addition, the first reinforced polymer-based substrate 22 and the second reinforced polymer-based substrate 24 may be fabricated from materials that include fiber reinforced materials. In a particular embodiment, the first reinforced polymer-based substrate 22 and the second reinforced polymer-based substrate 24 include graphite fibers that reinforce the first reinforced polymer-based substrate 22 and the second reinforced polymer-based substrate 24. In other particular embodiments, the graphite fibers are disposed in the first reinforced polymer-based substrate 22 and the second reinforced polymer-based substrate 24 according to a predetermined pattern, which will be described in greater detail below. Although the composite structural member 10 includes a first reinforced polymer-based substrate 22 and a second reinforced polymer-based substrate 24 having approximately constant thicknesses $t_1$ and $t_2$, respectively, it is understood that the thicknesses $t_1$ and $t_2$ may be variable either continuously or even non-continuously, as the member 10 extends in an x-direction. Further, the substrate 22 and/or the substrate 24 may extend in a y-direction to any desired length.

Figure 2:
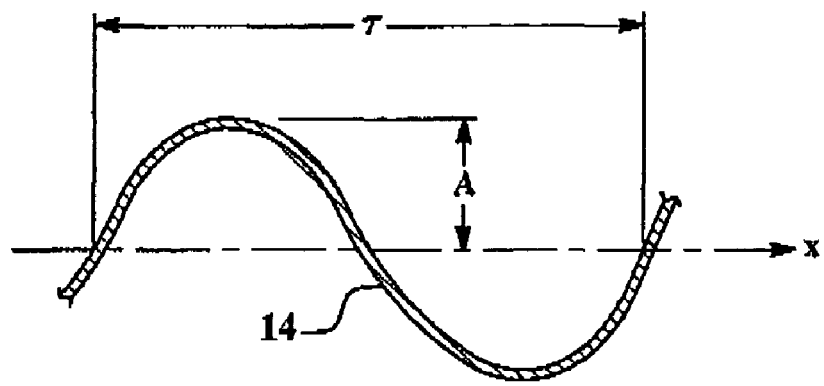
FIG. 2 is a partial cross sectional view of the web portion viewed along the cross section 2-2 shown in FIG. 1.

FIG. 2 is a partial cross sectional view of the web portion 14 viewed along the cross section 2-2 shown in FIG. 1. The web portion 14 has a generally sinusoidal cross sectional shape having a period τ, and amplitude A. The period τ and the amplitude A may be approximately constant as the composite structural member 10 of FIG. 1 extends in the x-direction, or at least one of the period τ and the amplitude A may vary either continuously or non-continuously as the member 10 extends in the x-direction. As will be discussed later in more detail, flat portions (not shown in FIG. 2) may also be incorporated into the continuous web portion 14 to support the attachment of other structural members. In another embodiment, the web portion 14 may be a compound waveform. For example, a first sinusoidal waveform may include another generally sinusoidal second waveform superimposed on the first waveform.

Figure 3:
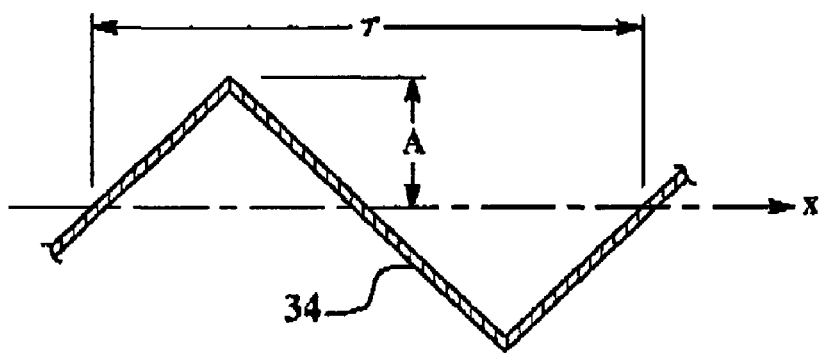
FIG. 3 is a partial cross sectional view of a web portion viewed along the cross section 2-2 shown in FIG. 1, according to another embodiment of the invention.

FIG. 3 is a partial cross sectional view of a web portion 34 viewed along the cross section 2-2 shown in FIG. 1, according to another embodiment of the invention. The web-portion 34 has a generally triangular-wave cross sectional shape, and has a period τ, and amplitude A. As in the previous embodiment, the period τ and the amplitude A may be approximately constant as the composite structural member 10 extends in the x-direction, or at least one of the period τ and the amplitude A may vary either continuously or non-continuously as the member 10 extends in the x-direction.

Figure 4:
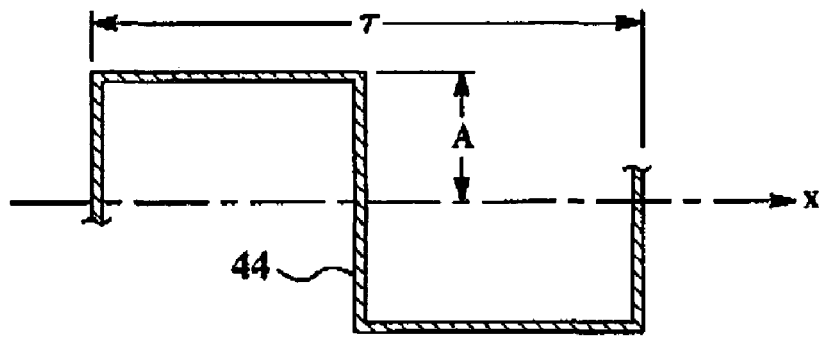
FIG. 4 is another partial cross sectional view of a web portion viewed
along the cross section 2-2 shown in FIG. 1, according to still another embodiment of the invention.

FIG. 4 is another partial cross sectional view of a web portion 44 viewed along the cross section 2-2 shown in FIG. 1, according to still another embodiment of the invention. The web-portion 44 has a generally square-wave cross sectional shape, and has a period τ, and amplitude A. As in the previous embodiments, the period τ and the amplitude A may be approximately constant as the composite structural member 10 extends in the x-direction, or at least one of the period τ and the amplitude A may vary either continuously or non-continuously as the member 10 extends in the x-direction. Although FIG. 2 through FIG. 4 shows regular periodic cross-sectional shapes for the web portion 14 of FIG. 1, it is understood that other cross sectional shapes are possible. For example, it is understood that other periodic cross sectional shapes may be generated by combining sine and cosine functions in a Fourier series expansion to generate a desired periodic function.

Figure 5:
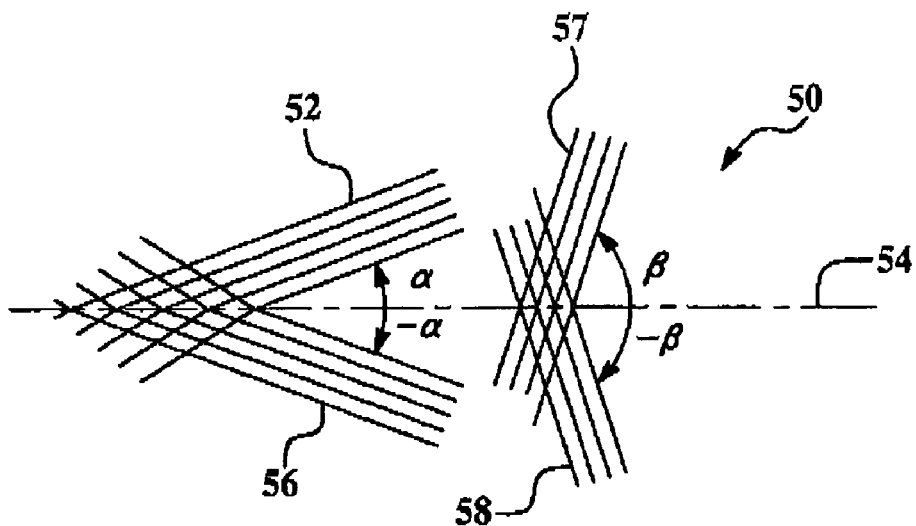
FIG. 5 is a schematic view of a ply arrangement for a plurality of reinforcing fibers included in at least one of the first reinforced polymer-based substrate and the second reinforced polymer-based substrate of FIG. 1, according to still another embodiment of the invention.

FIG. 5 is a schematic view of a ply arrangement 50 for a plurality of reinforcing fibers included in at least one of the first reinforced polymer-based substrate 22 and the second reinforced polymer-based substrate 24 of FIG. 1, according to still another embodiment of the invention. The ply arrangement 50 includes a first layer of reinforcing fibers 52 that are oriented at an angle α with respect to a predetermined orientation direction 54, and a second layer of reinforcing fibers 56 that are oriented at an angle −α with respect to the orientation direction 54. The first layer of reinforcing fibers 52 and the second layer of reinforcing fibers 56 are applied to at least one of the first reinforced polymer-based substrate 22 and the second reinforced polymer-based substrate 24 of FIG. 1 in adjacent layers. In one particular embodiment, α is approximately about five degrees.

The ply arrangement 50 further includes a third layer of reinforcing fibers 57 that are oriented at an angle β with respect to a predetermined orientation direction 54, and a fourth layer of reinforcing fibers 58 that are oriented at an angle −β with respect to the orientation direction 54. The third layer of reinforcing fibers 57 and the fourth layer of reinforcing fibers 58 are also applied to at least one of the first reinforced polymer-based substrate 22 and the second reinforced polymer-based substrate 24 of FIG. 1 in adjacent layers. In one particular embodiment, β is approximately about sixty-five degrees. The ply arrangement 50 may include the first and second layers 52 and 56, and the third and fourth layers 57 and 58 in any predetermined ratio, but in a particular embodiment, the ratio is approximately 80% first and second layers of reinforcing fibers 52 and 56, with the balance being the third and fourth layers of reinforcing fibers 57 and 58.

Figure 5A:
FIG. 5A is a ply arrangement for a plurality of reinforcing fibers according to another embodiment of the invention.

Referring now to FIG. 5A, a ply arrangement 100 according to another embodiment of the invention includes a first ply group 102, a second ply group 104, a third ply group 106, and a fourth ply group 104. The numbers within each of the ply groups 102, 104, 106 and 108 correspond to the plies shown in FIG. 5. For example, the first ply group 102 includes the first layer of reinforcing fibers 52 and the second layer of reinforcing fibers 56, the third layer of reinforcing fibers 57, and is followed by another first layer of reinforcing fibers 52 and second layer of reinforcing fibers 56. The first group 102, the second group 104, the third group 106 and the fourth group 108 may be applied in any desired combination and may be repeated to any desired degree. In one particular embodiment, a structure includes at least about 60% of the first layer of reinforcing fibers 52 and the second layer of reinforcing fibers 56.

Figure 6:
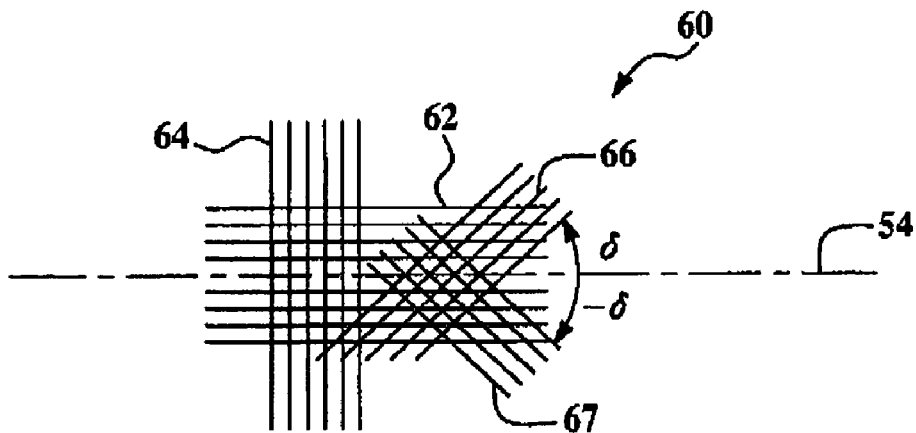
FIG. 6 is a schematic view of a ply arrangement for a plurality of reinforcing fibers included in at least one of the first reinforced polymer-based substrate and the second reinforced polymer-based substrate of FIG. 1, according to still yet another embodiment of the invention.

FIG. 6 is a schematic view of a ply arrangement 60 for a plurality of reinforcing fibers included in at least one of the first reinforced polymer-based substrate 22 and the second reinforced polymer-based substrate 24 of FIG. 1, according to still yet another embodiment of the invention. The ply arrangement 60 includes a first layer of reinforcing fibers 62 that are approximately aligned with the predetermined orientation direction 54, and a second layer of reinforcing fibers 64 that are approximately perpendicular to the orientation direction 54. The ply arrangement 60 also includes a third layer of reinforcing fibers 66 that are oriented at an intermediate angle δ with respect to the orientation direction 54, and a fourth layer of reinforcing fibers 67 that are oriented at an intermediate angle −δ with respect to the orientation direction 54. The first layer of reinforcing fibers 62 and the second layer of reinforcing fibers 64 may be applied in adjacent layers, with the third layer 66 and the fourth layer 67 applied either above or below the adjacent layers, or alternately, the third layer of reinforcing fibers 66 and the fourth layer of reinforcing fibers 67 may be interposed between the first layer 62 and the second layer 64. In one particular embodiment, the third layer 66 and the fourth layer 67 are interposed between the first layer 62 and the second layer 64, and δ is approximately about forty-five degrees.

Figure 7:
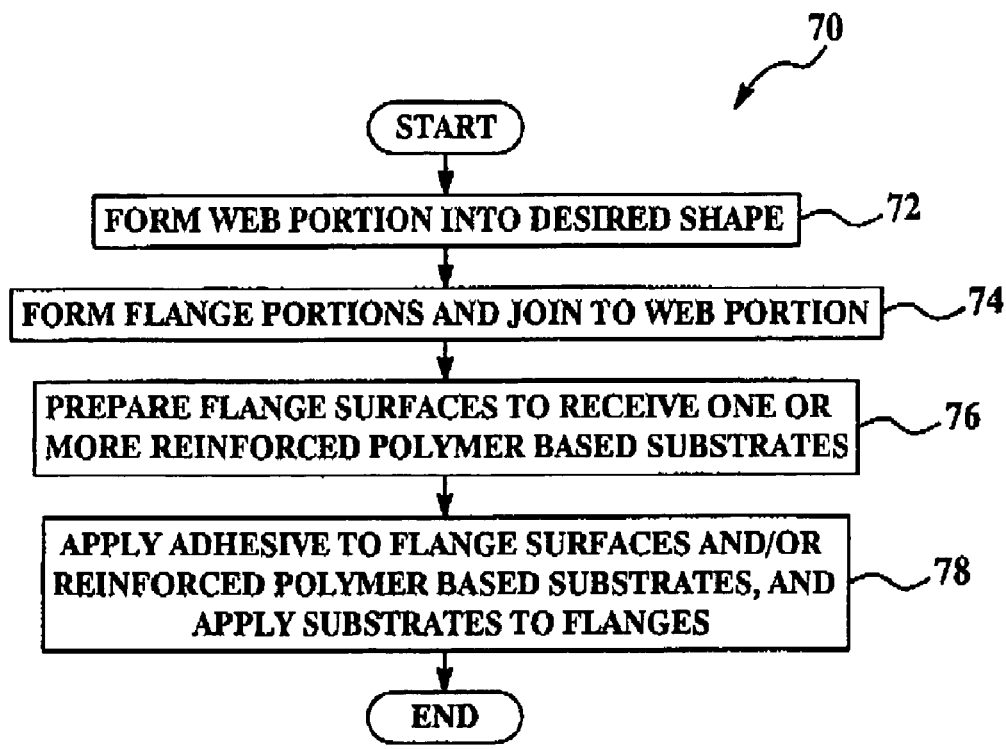
FIG. 7 is a flowchart that shows a method of making a composite structural member according to still yet another embodiment of the invention.
Figure 8:
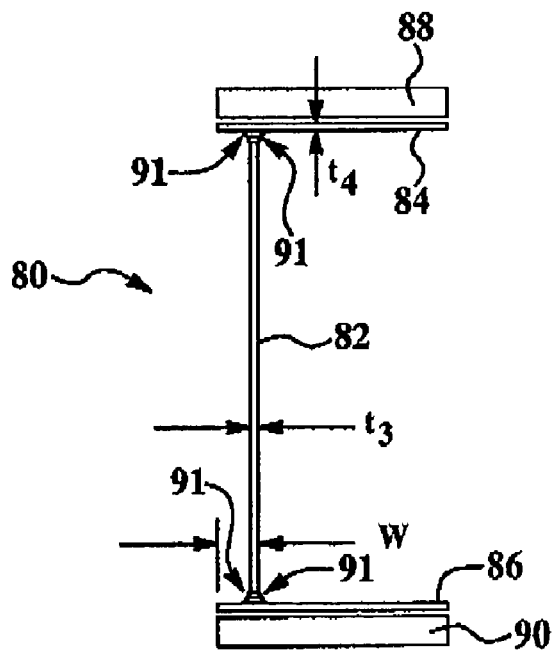
FIG. 8 is a cross sectional view of the structural member shown in FIG. 1.

FIG. 7 is a flowchart that shows a method 70 of making a composite structural member according to still yet another embodiment of the invention. At block 72, the web portion 14

(FIG. 1) is formed into a desired periodic or non-periodic shape. The web portion 14 may be formed by rolling, stamping, or by other well-known metal forming methods. At block 74, the first flange portion 16 and the second flange portion 18 are formed by cutting, shearing, or by other methods. The first flange portion 16 and the second flange portion 18 may then be joined to the web-portion 14 by welding. In one particular embodiment, the first flange portion 16 and the second flange portion 18 are welded to the web portion 14 using a laser welding apparatus. Alternately, the first flange portion 16 and the second flange portion 18 may be joined to the web portion 14 using a brazing process, or using a super-plastic forming process.

At block 76, surfaces of the first flange portion 16 and the second flange portion 18 are chemically prepared to receive the first reinforced polymer-based substrate 22 and the second reinforced polymer-based substrate 24, respectively. In one particular embodiment, the surfaces are prepared by subjecting the surfaces to an acid etch, that is followed by the application of a conversion coating to the surfaces. In another particular embodiment, the surfaces are prepared using a sol-gel method to improve the surface adhesion properties of the first flange portion 16, and the second flange portion 18. One suitable sol-gel method is disclosed in U.S. Pat. No. 6,037,060 to Blohowiak, et al., entitled "SOL FOR BONDING AN EPOXY TO ALUMINUM OR TITANIUM ALLOYS", which patent is incorporated herein by reference.

At block 78, an adhesive is applied to the surfaces prepared at block 76, and the first reinforced polymer-based substrate 22 and the second reinforced polymer-based substrate 24 are positioned on the flanges. The substrates 22 and 24 may be held in place by applying pressure on the first reinforced polymer-based substrate 22 and the second reinforced polymer-based substrate 24 until the adhesive is cured.

The composite structural member described above is subject to optimization and refinement in order to better meet increasingly challenging design criteria, such as those found in the aerospace industry. For example, referring to FIG. 8, a composite structural member in the form of a beam 80 of the type shown in FIG. 1, has a pair of spaced apart flanges 84, 86 joined by welds 91 to a web 82. A pair of reinforced, polymer-based substrates or caps 88, 90 are bonded to the flanges 84, 86 using adhesive materials and processes as previously described. The web 82 has a thickness $t_3$, and the flanges 84, 86 each has a thickness $t_4$.

It has been found that the thickness $t_4$ of the flanges 84, 86 should be at least roughly the same order of magnitude as the thickness $t_3$ of the web 82 to facilitate welding, however, it is preferable to maintain $t_4$ from one to three times the value of $t_3$ in order to promote the formation of good weld nuggets 91. This optimized $t_4/t_3$ ratio aids in maximizing beam strength while reducing the possibility that a weld 91 will melt either through the web 82 or the flanges 84, 86, thus weakening the structure. Also, since the value of $t_4$ can affect peel loads on the bond line between the flanges 84, 86 and the associated composite caps 88, 90, finite element analysis may also used to assist in optimizing the values of $t_3$ and $t_4$.

Because the reinforced composite caps 88, 90 are bonded to the flanges 84, 86 using structural adhesive pastes or films, certain geometric characteristics of the beam 80 can adversely affect the stresses imposed on the bond lines between the caps 88, 90 and the beam flanges 84, 86. For example, the distance that a flange and associated cap, e.g. flange 86 and cap 88, extend laterally beyond the web 82 can affect bond line strength. By providing a minimal amount of overhang W of both the flanges 84, 86 and caps 88, 90, concentration of stress is avoided at the edges. The exact amount of desired overhang W will depend upon the application, materials and geometry of the beam 80, however the overhang W should be greater than zero. In one embodiment, an overhang W of 0.25 inches was found to provide satisfactory results where the width of the flange 84, 86 was 1.5 inches.

As previously discussed, the reinforced composite caps 88, 90 can be bonded to the flanges 84, 86 using commercially available structural adhesives, offered by suppliers such as Hysol, JD Lincoln, Hexcel and Cytec. Film type adhesives are advantageous because they are produced in predetermined film thicknesses, thus making it easier to control the thickness of the applied adhesive. However, in order to achieve maximum effectiveness, film adhesives require that the part surfaces being bonded closely mate or fit throughout the bonding area. Paste type adhesives may not perform as well as film adhesives in some applications, however paste adhesives have the advantage of conforming more closely to the part surfaces being bonded. Also, paste adhesives do not require the application of heat or autoclaving in order to cure Because the bond lines between the flanges 84, 86 and the composite caps 88, 90 are subjected to a variety of stresses, it is important that the structural bonding adhesive, whether paste or film, have an appropriate amount of ductility. Ductility, in an appropriate amount, allows the adhesive to stretch slightly in response to applied stresses, without cracking or bond failure. Ductility resulting in elongation of the adhesive after curing, of approximately two to five percent has been found to provide satisfactory results for a variety of applications.

The dimensions of the various components of the beam 80 will depend upon the particular application, as well as the loading of the beam 80. Generally, these dimensions can be determined using finite element analysis. In the case of floor beams for commercial aircraft, for example, the floor loads imposed on the beams arise primarily from the weight of passengers or cargo, and the pressure of the cabin within the fuselage. The resulting bending moments and shear loads are a function of these applied loads, as well as the span of the beam and the location of beam supports. The thickness of the web 82 is determined in part by the shear loads, and can be calculated using by the formula:

$$Tw = Fs/(H \times Ssa)$$

where:
    Ssa=shear stress (titanium allowable shear stress)
    Fs=sheer load, applied
    H=beam height
    Tw=web thickness In some cases, additional engineering analysis may be required to resolve stability issues such as buckling, breaking and crippling.

The thickness of the reinforced composite caps 88, 90 depends in part on the estimated bending moments as well as other factors, however a general formula for determining this thickness is as follows:

$$Tc = M/(Wc \times Sb \times H \times Wc)$$

where:
    Tc=cap thickness
    Wc=cap width
    Sb=allowable stress (tension or compression) for graphite laminate
    M=applied moment
    H=beam height The thickness of the composite caps 88, 90 affects the distribution of the shear load on the beam 80. A particular cap 88, 90 distributes the sheer load over a longer width beam however this thickness must be balanced against the additional weight created by a thicker cap.

The thickness of the composite caps 88, 90 can be tailored along the length of the beam 80 to match the bending moments present at various points along the beam 80. Tailoring of the cap is accomplished by placing additional plies in the laminate at the heavily loaded portions of the caps 88, 90, and fewer plies on the more lightly loaded portions of the caps 88, 90. Typically, the more heavily loaded portions of the caps 88, 90 will curve toward the middle of the beam, and at stanchion and joints. The more lightly loaded portions of the caps 88, 90 typically occur at the points where the beam is attached to the aircraft's frame. It should be noted here that in some applications, the composite cap 88, 90 may not extend over the entire length of the flanges 84, 86, since some sections of the beam 80 may possess strength characteristics that are sufficient so as to obviate the need for a composite cap at these sections.

In those applications where the height of the beam 80 must be varied along its length, sharp transitions in the height of the web 82 should be avoided, and rather, the caps 88, 90 should be tailored to provide broadly curved bends in the beam 80, having relatively large radii of curvature. Slowly curving beam bends have been found to reduce the stresses applied to the bond line between the caps 88, 90 and the corresponding flanges 84, 86.

Cracking of the bond line between the flanges 84, 86 and the composite cap 88, 90 is possible as a result of manufacturing defects, or either direct impact or abuse suffered in-service. Such cracks can also be generated in the resin which holds the plies of laminate together that form the composite caps 88, 90. In order to reduce the possibility of such cracking, or at least arrest propagation of cracks, crack arresting fasteners (not shown) can be used to fasten the composite caps 88, 90 to the corresponding flanges 84, 86. The exact placement of these fasteners will depend on the particular application and the specific dimensions and geometry of the beam 80. Suitable fasteners may include rivets, bolts, blind rivets, pins or other types of commonly used structural fasteners.

Figure 9:
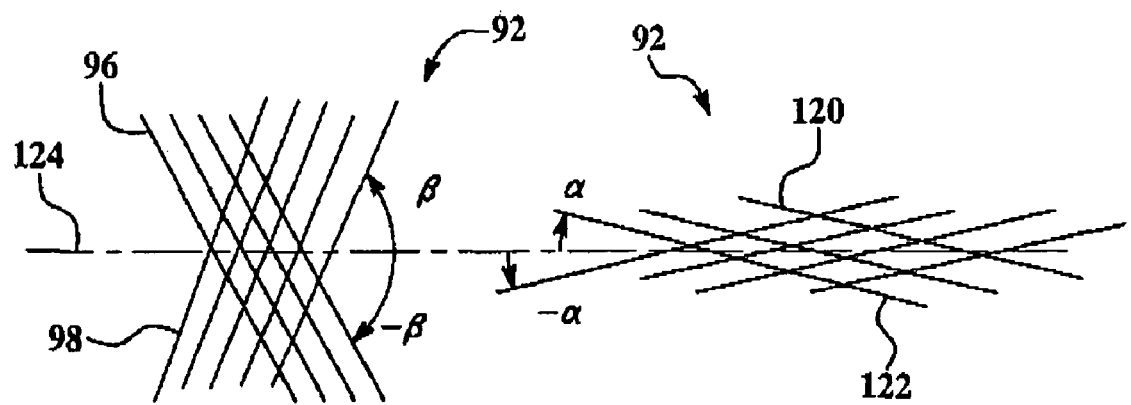
FIG. 9 is a schematic view of an ultimate ply arrangement used in forming the composite caps.

Attention is now directed to FIG. 9 where a ply arrangement 92 is shown, consisting of four plies 96, 98, 120, 122 formed by reinforcing fibers such as carbon fibers. Ply arrangement 92 is preferably used in laying up the laminates that comprises the composite caps 88, 90 shown in FIG. 8. The ply arrangement 92 includes a first layer of reinforcing fibers 96 oriented at an angle β with respect to a predetermined orientation direction or axis 124, and a second layer of reinforcing fibers 98 that are oriented at an angle −β with respect to the orientation axis 124. It has been found that an angle β of between 55 and 80 degrees provides the composite cap with markedly greater shear resistance compared to the traditionally used angles of 45 degrees combined with 90 degrees. Optimal results have been realized using an angle β between 55 and 75 degrees.

The ply arrangement 92 further includes third and fourth layers of reinforcing fibers 120, 122 respectively which are angled relative to the orientation axis 124 at angles α, and −α. It has been found that use of an angle α of between approximately 1 and 20 degrees provides superior results, with optimum results occurring between approximately 3 and 12 degrees. A ply arrangement comprising 20% fibers oriented at angle β, and 80% fibers oriented at angle α is preferred. As a result of the superior stiffness and strength of laminates using the above ply arrangement, fewer layers of reinforcing fiber may be required in some applications.

Figure 10:
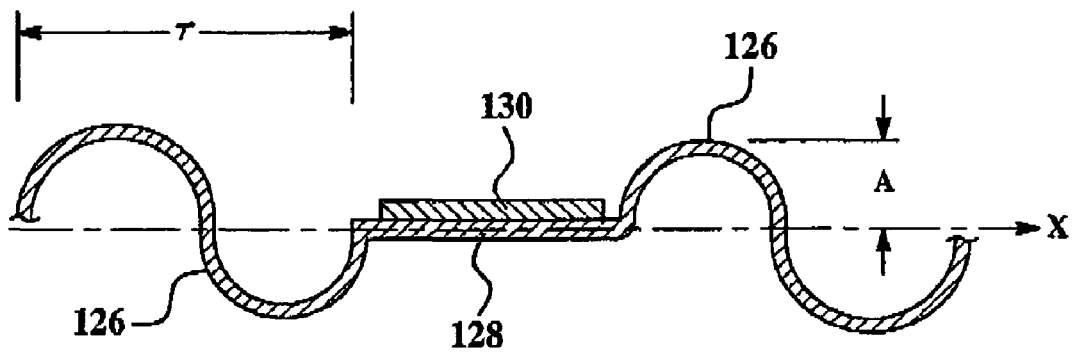
FIG. 10 is a fragmentary, cross sectional view taken through a portion of a web having both flat and undulating sections.
Figure 11:
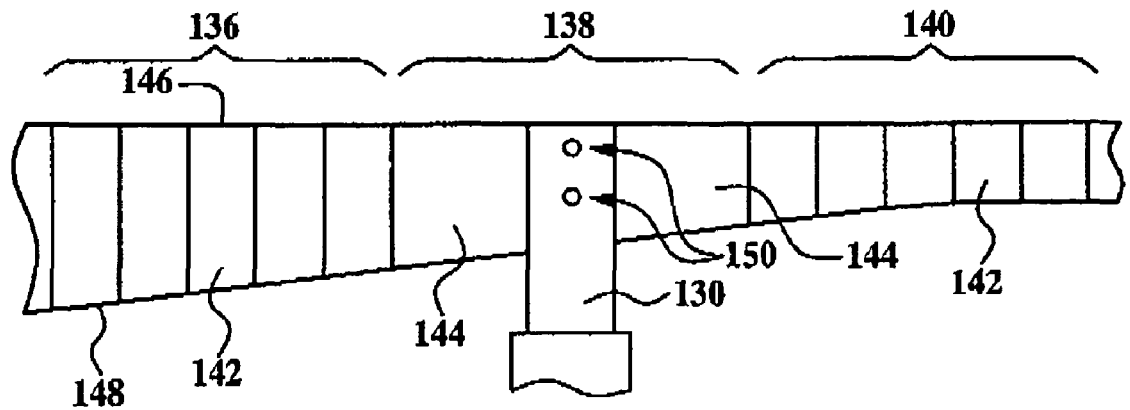
FIG. 11 is a fragmentary, side view of a curved beam having both undulating and flat sections.

As previously mentioned, it may be desirable to provide a beam 80 having both undulating and non-undulating, i.e. flat or planar, sections. The flat sections of the web 82 facilitate the attachment of supports, stanchions or other structural features to the beam 80. Such an arrangement is depicted in FIG. 10, in which a flat section 128 of the web is provided between two undulating web sections 126. The flat section 128 of the web allows the attachment thereto of a flat support plate 130 using fasteners or weldments (not shown) in order to support the beam at various locations within the aircraft. FIG. 11 depicts a portion of a beam having a flat upper cap 146, and a gently curved lower cap 148. The beam comprises two sections 136, 140 provided with an undulating web 142, joined to a central section 138 that utilizes a flat web 144. The flat web 144 provides a flat surface used to cure the beam to a support 130 by means of fasteners 150.

Figure 12:
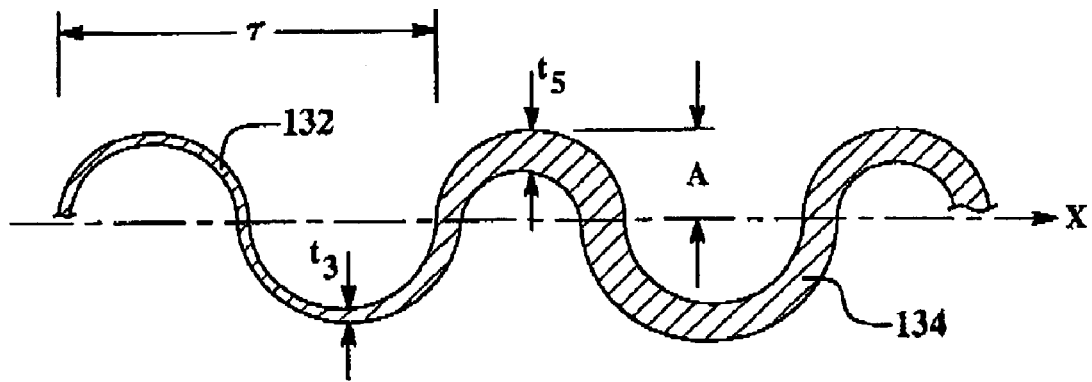
FIG. 12 is a fragmentary, cross sectional view of an undulating web which varies in thickness.

Attention is now directed to FIG. 12 which depicts an undulating web having a thickness that varies in the direction of the length of the beam. Web section 132 possesses a thickness $t_3$ and transitions into a web section 134 having a thickness $t_5$. The web shown in FIG. 12 may be produced in accordance with the process disclosed in U.S. patent application Ser. No. 11/464,650, filed Aug. 15, 2006, entitled "Apparatus and Method for Forming Corrugated Members". The web construction shown in FIG. 12 can be utilized to provide additional resistance to shear loads at certain points along the length of the beam where necessary.

Figure 13:
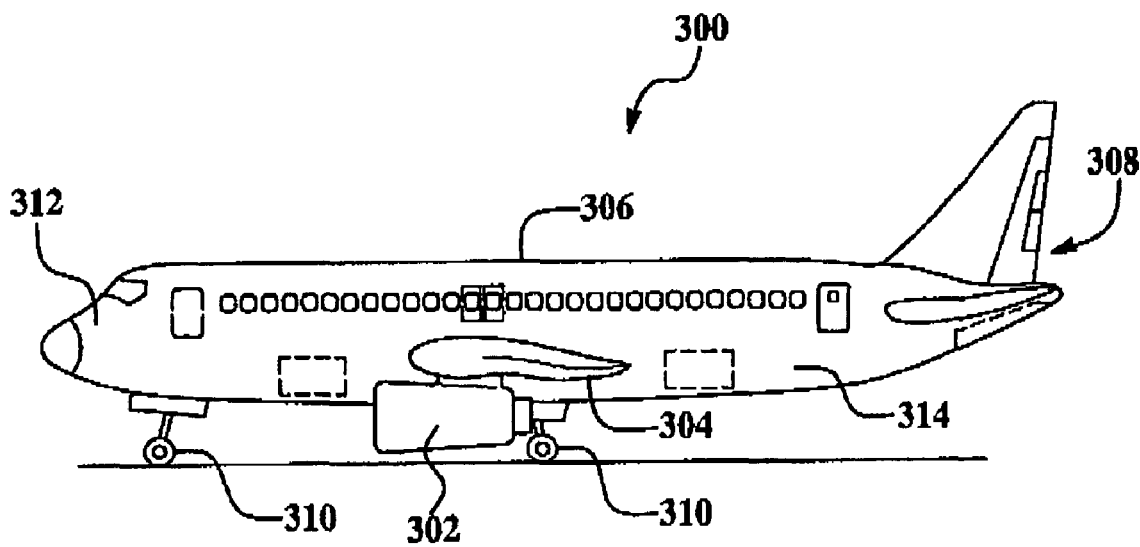
FIG. 13 is a side elevation view of an aircraft having one or more of the disclosed embodiments of the present invention.

Referring now in particular to FIG. 13, a side elevation view of an aircraft 300 having one or more of the disclosed embodiments of the present invention is shown. The aircraft 300 generally includes a variety of components and subsystems known in the pertinent art, which in the interest of brevity, will not be described in detail. For example, the aircraft 300 generally includes one or more propulsion units 302 that are coupled to wing assemblies 304, or alternately, to a fuselage 306 or even other portions of the aircraft 300. Additionally, the aircraft 300 also includes a tail assembly 308 and a landing assembly 310 coupled to the fuselage 306, and a flight control system 312 (not shown in FIG. 8), as well as a plurality of other electrical, mechanical and electromechanical systems that cooperatively perform a variety of tasks necessary for the operation of the aircraft 300.

With continuing reference to FIG. 13, the aircraft 300 may include one or more of the embodiments of the composite structural member 314 according to the present invention, which may be incorporated into various structural portions of the aircraft 300. For example, the various disclosed embodiments may be used to form stringers in the wing assemblies 304 and/or surfaces in the tail assembly 308, or may be used to form floor beams (not shown in FIG. 8) positioned within the fuselage 306.

The aircraft 300 is generally representative of a commercial passenger aircraft, which may include, for example, the 737, 747, 757, 767 and 777 commercial passenger aircraft available from The Boeing Company of Chicago, Ill. In alternate embodiments, the present invention may also be incorporated into flight vehicles of other types. Examples of such flight vehicles include manned or unmanned military aircraft, rotary wing aircraft, or even ballistic flight vehicles, as illustrated more fully in various descriptive volumes, such as Jane's All The World's Aircraft, available from Jane's Information Group, Ltd. of Coulsdon, Surrey, LJK.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A composite structural member, comprising:
a central structural portion extending in a first direction and including first and second flange portions spaced apart in a second direction, the first and second flanges being connected by a web having a planar section, and a non-planar section; wherein said web has a thickness that varies in said first direction;
a first reinforced polymer-based substrate secured to the first flange portion; and
a second reinforced polymer-based substrate secured to the second flange portion.

2. The composite structural member of claim 1, wherein the non-planar portion comprises at least one of a periodic undulation portion and a non-periodic undulation portion.

3. The composite structural member of claim 1, wherein the non-planar portion includes a periodic undulation comprising at least one of an approximately sinusoidal undulation, a triangular wave undulation and a square wave undulation.

4. The composite structural member of claim 1, wherein the web portion has a depth extending between the first flange and the second flange, and the web depth varies in the first direction.

5. The composite structural member of claim 2, wherein the non-planar portion is a periodic undulation having a period and an amplitude, and at least one of the period and the amplitude varies in the first direction.

6. The composite structural member of claim 1, wherein at least one of the first reinforced polymer-based substrate and the second reinforced polymer-based substrate is a fiber reinforced substrate having layers of fibers positioned in the substrate in a predetermined pattern, wherein the predetermined pattern comprises a first layer oriented at an angle $\alpha$ with respect to a selected reference direction, a second layer oriented at an angle $-\alpha$ with respect to the reference direction, a third layer oriented at an angle $\beta$ with respect to the reference direction, and a fourth layer oriented at an angle $-\beta$ with respect to the reference direction, wherein angle $\alpha$ is between approximately 1 and 20 degrees and angle $\beta$ is between approximately 55 and 80 degrees.

7. The composite structural member of claim 6, wherein the angle $\alpha$ is between approximately 3 and 12 degrees, and the angle $\beta$ is between approximately 55 and 75 degrees.

8. The composite structural member of claim 6, wherein the predetermined pattern further comprises at least about 80% first and second layers, and 20% third and fourth layers.

9. The composite structural member of claim 6, wherein the fiber reinforced substrate is a graphite fiber reinforced substrate.

10. The composite structural member of claim 1, wherein:
each of the first and second flange portions is welded to the web, and
each of the first and second flange portions has a thickness 1 to 3 times greater than a thickness of the web.

11. The composite structural member of claim 1, further comprising a first adhesive layer that bonds the first reinforced polymer-based substrate to a surface of the first flange portion, and a second adhesive layer that bonds the second reinforced polymer-based substrate to a surface of the second flange portion.

12. The composite structural member of claim 1, wherein the central structural portion is comprised of one of aluminum, titanium and steel.

13. A method of fabricating a composite structural member, comprising:
(A) forming a first web portion into a desired non-planar shape;
(B) forming a second web portion into a generally planar shape; wherein at least one of said first web portion and said second web portion formed has a thickness that varies in a longitudinal direction of said composite structural member;
(C) forming a web by joining the first and second web portions formed in step (A) and (B), respectively;
(D) joining at least one flange portion to the web formed in step (C); and
(E) joining a reinforced polymer-based substrate to the at least one flange portion.

14. The method of claim 13, wherein step (A) includes forming said first web portion into at least one of a periodic undulating shape and a non-periodic undulating shape.

15. The method of claim 13, wherein step (A) includes:
forming said first web section in a first thickness,
forming a second web section in a second thickness less than the first thickness, and
joining the first and second web sections together.

16. A structural beam for aerospace vehicles, comprising:
first and second spaced apart flanges;
a web connecting the first and second flanges and having a thickness that varies in the direction of the length of the beam, the web further having a planar section and a nonplanar section, said nonplanar section comprising an undulating portion; and,
a reinforced polymer-based substrate secured to at least a Portion of one of the first and second flanges.

17. The structural beam of claim 16, wherein the planar section includes a flat portion joined to the undulating portion.

18. The structural beam of claim 16, wherein the undulating portion is a periodic undulation.

19. The structural beam of claim 17, wherein:
the undulating portion includes first and second sections, and
the flat portion of the web is between the first and second sections of the undulating portion.

20. The structural beam of claim 17, wherein:
each of the first and second flanges is welded to the web, and
each of the first and second flanges has a thickness 1 to 3 times greater than a thickness of the web.

21. The structural beam of claim 16, wherein the undulating portion includes a periodic undulation comprising at least one of an approximately sinusoidal undulation, a triangular wave undulation and a square wave undulation.

22. The structural beam of claim 16, wherein the web has a depth extending between the first flange and the second flange, and the web depth varies in the direction of the length of the beam.

23. The structural beam of claim 16, wherein at least one of the first reinforced polymer-based substrate and the second reinforced polymer-based substrate is a fiber reinforced substrate having layers of fibers positioned in the substrate in a predetermined pattern, wherein the predetermined pattern comprises a first layer oriented at an angle $\alpha$ between approximately 1 and 20 degrees with respect to a selected reference direction, a second layer oriented at an angle $-\alpha$ with respect to the reference direction, a third layer oriented at an angle β with respect to the reference direction, and a fourth layer oriented at an angle −β with respect to the reference direction, wherein angle α is between approximately 1 and 20 degrees and angle β is between approximately 55 and 80 degrees.

24. The structural beam of claim 23, wherein the angle α is between approximately 3 and 12 degrees, and the angle β is between approximately 55 and 75 degrees.

25. The structural beam of claim 23, wherein the predetermined pattern further comprises at least about 80% first and second layers, and 20% third and fourth layers.

26. The structural beam of claim 16, wherein the fiber reinforced substrate is a graphite fiber reinforced substrate.

* * * * *